United States Patent
Brush et al.

[19]

[11] Patent Number: 6,145,401
[45] Date of Patent: Nov. 14, 2000

[54] MODULAR CONTROL HANDLE

[75] Inventors: Jeffrey A. Brush, Dunlap; Julien J. Schrenk, Peoria, both of Ill.

[73] Assignee: Caterpillar Inc., Peoria, Ill.

[21] Appl. No.: 09/397,274

[22] Filed: Sep. 16, 1999

Related U.S. Application Data

[62] Division of application No. 08/976,149, Nov. 21, 1997.

[51] Int. Cl.⁷ .............................. B60K 17/04; B60K 17/12
[52] U.S. Cl. .......................................... 74/473.12; 74/491
[58] Field of Search ................................ 74/491, 473.12, 74/473.1, 471 R

[56]  References Cited

U.S. PATENT DOCUMENTS

| | | | |
|---|---|---|---|
| 5,065,962 | 11/1991 | Adams et al. | 74/491 |
| 5,172,603 | 12/1992 | MacInnis | 74/335 |
| 5,244,066 | 9/1993 | Mackoway et al. | 74/471 R |
| 5,247,849 | 9/1993 | Sato | 74/475 |
| 5,957,001 | 9/1999 | Gualtieri et al. | 74/473.12 |

*Primary Examiner*—David Fenstermacher
*Attorney, Agent, or Firm*—William C. Perry; Calvin E. Glastetter

[57]  ABSTRACT

In the operation of construction machines it is quite common to provide a myriad of control levers for the various machine functions. Since the requirements for the implements controlled by the various levers are different, the control levers themselves are different, in operation as well as in physical configuration. The present invention comprehends a modular control handle having a grip assembly that is adaptable to accommodate one of a plurality of different control modules mountable therein. The control modules may be varied to accommodate various machine operations but the size and shape of the grip assembly may remain the same.

4 Claims, 6 Drawing Sheets

Fig. - 1 -
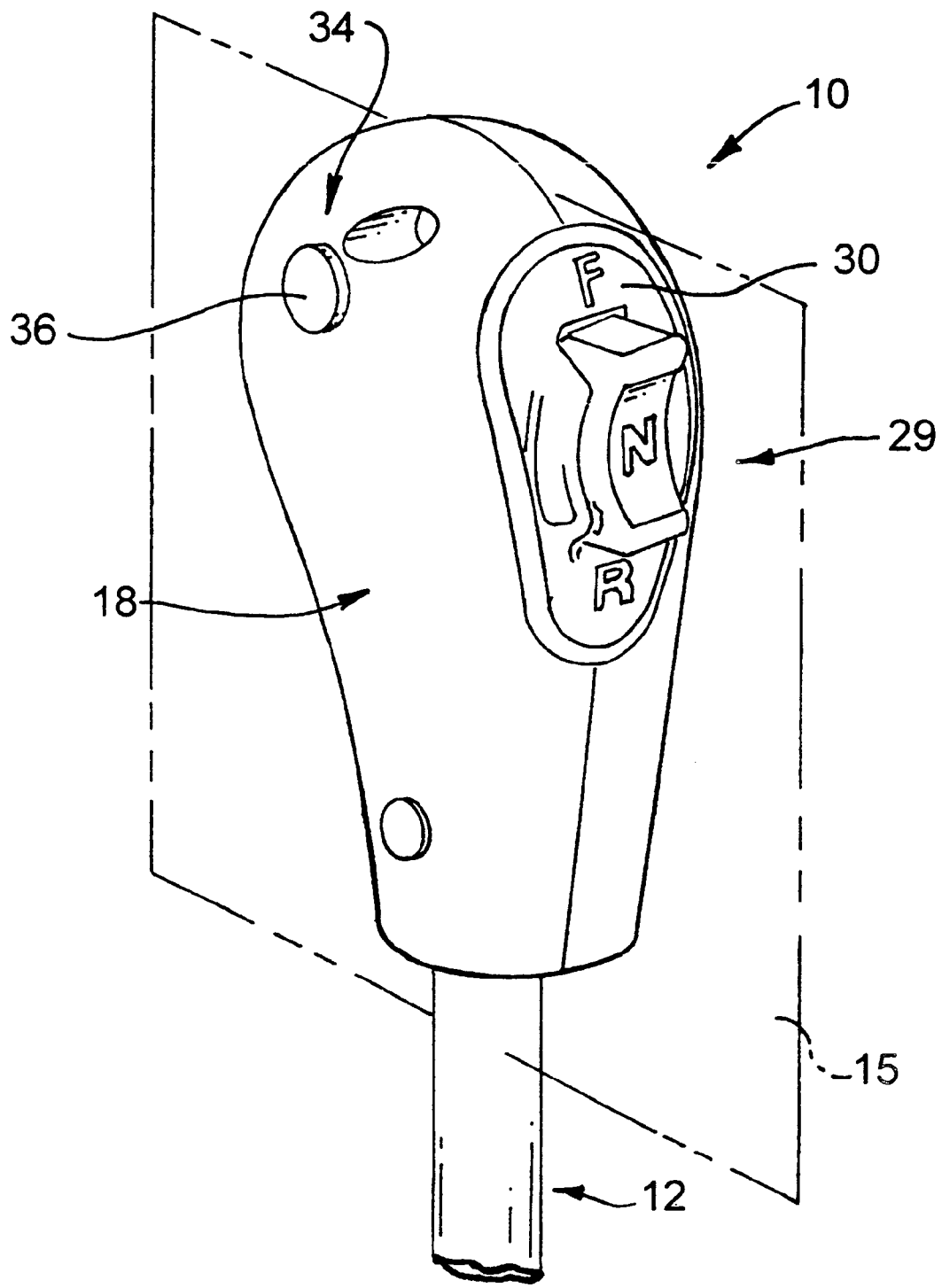

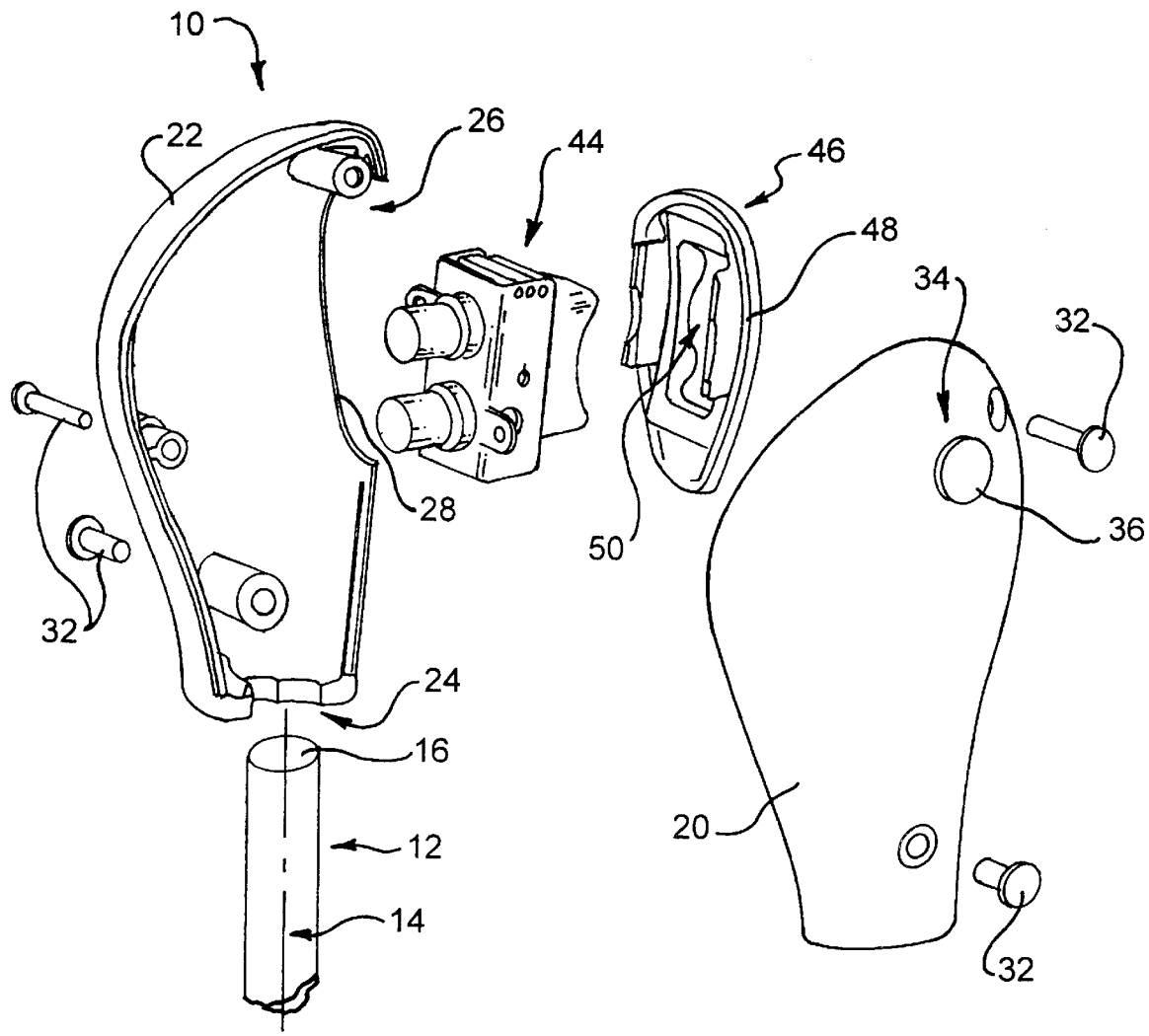
Fig. - 2 -

Fig. -3-
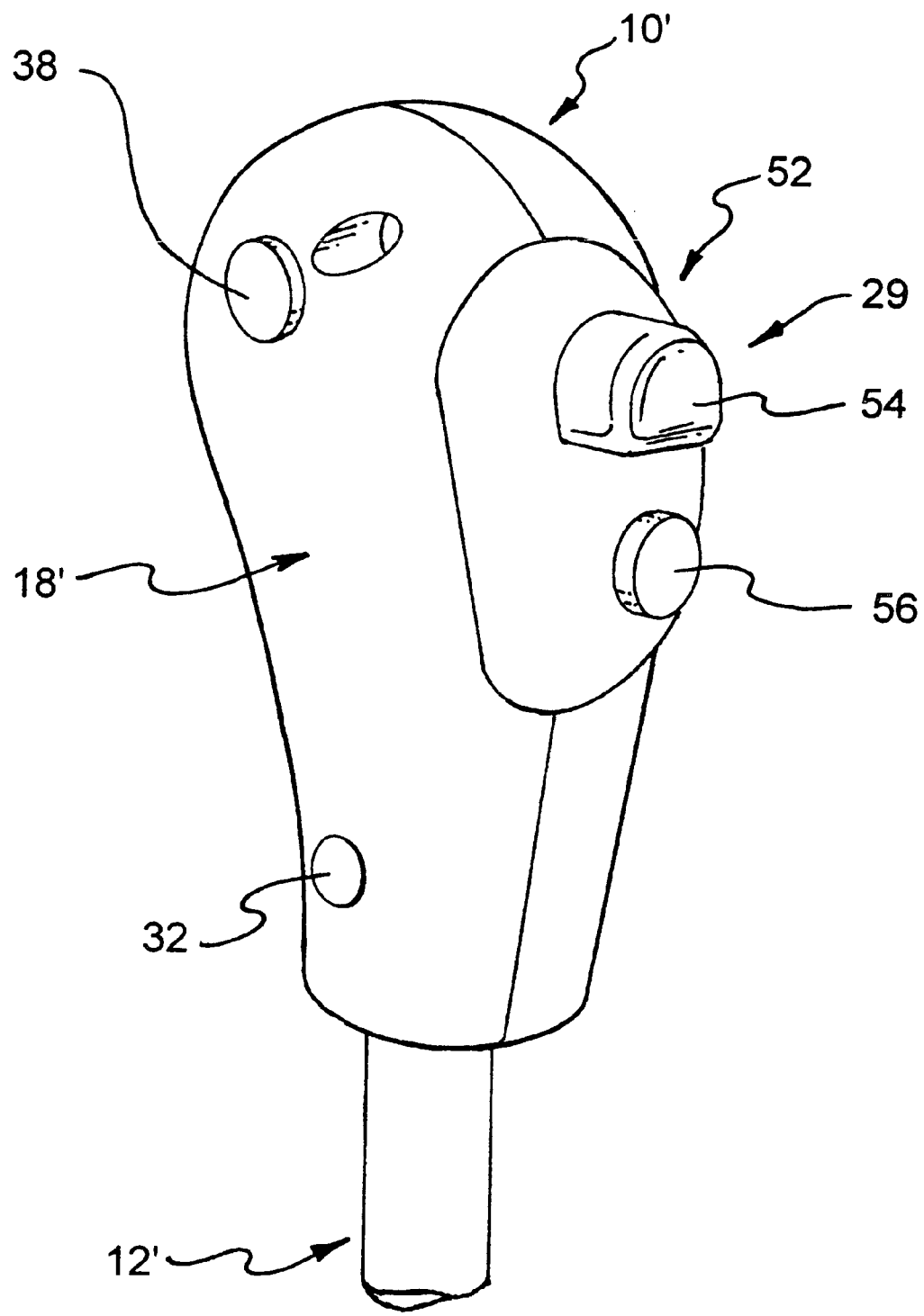

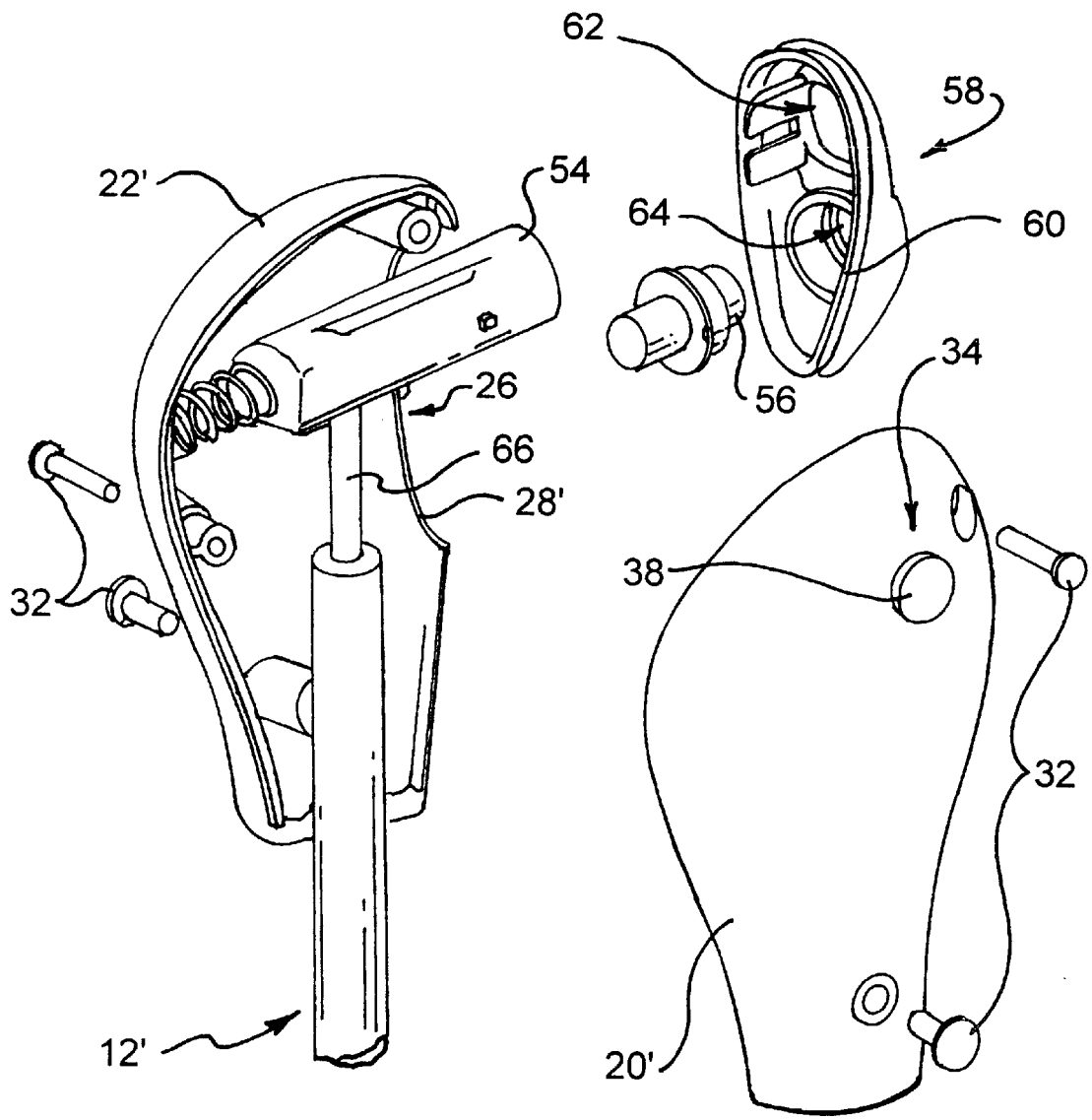
Fig. - 4 -

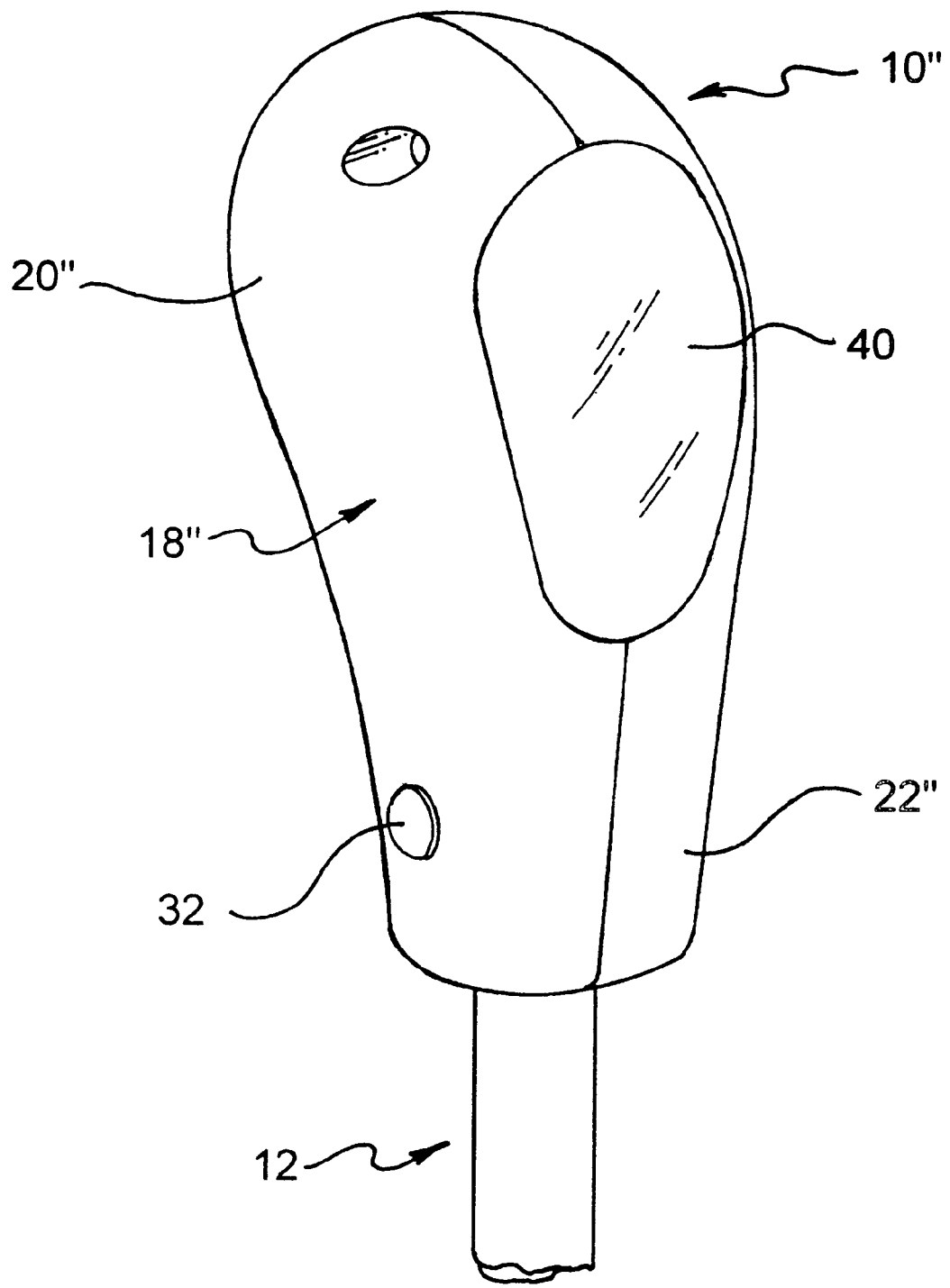
Fig. - 5 -

Fig. - 6 -
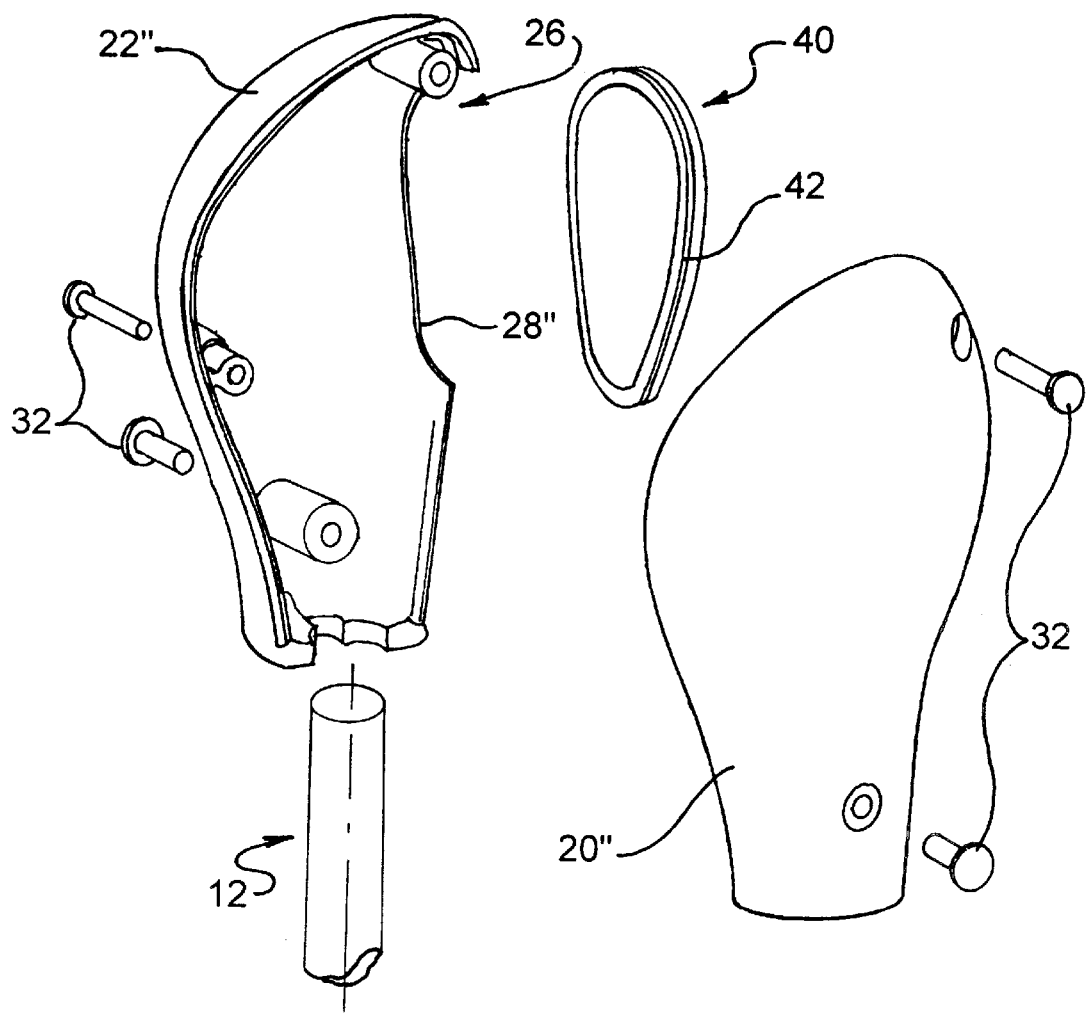

MODULAR CONTROL HANDLE

This is a divisional application of application Ser. No. 08/976,149, filed Nov. 21, 1997.

TECHNICAL FIELD

This invention relates generally to a work machine control mechanism and more particularly to a modular control handle which is alternately configurable as for controlling one of a plurality of machine functions.

BACKGROUND OF THE INVENTION

In the work machine industry, it is often desirable to minimize the number of different machine parts to reduce the costs of inventory. It is also desirable to have a commonly-shaped ergonometric control handle for operator convenience and familiarity on different work machines. For example, on a particular work machine, a transmission gear selector may be required on a particular control lever, while on another work machine having an similarly-shaped control lever, a mechanical actuator control may be required. Yet another work machine may have an similarly-shaped control lever requiring a handle but not presently requiring a control module.

In U.S. Pat. No. 5,277,077 issued to Osborn on Jan. 11, 1994, a modular vehicle transmission shifter mechanism is described. The shifter mechanism is so constructed that it is adapted to be used for the transmissions of different vehicles requiring different throws. The shifter provides a design in which essentially all of the components are utilized for different shifters of different vehicles and the only change is to provide a different pawl detent member and roller detent member for each vehicle. However, what is presently desired is a control handle which is adaptable to different work machine control requirements, not to different transmission shifter throws. What is desired, then, is a modular control handle having a commonly-shaped grip portion which is adaptable to different control mechanism requirements for similarly-shaped control levers on different work machines.

The present invention is directed to overcoming one or more of the problems set forth above.

DISCLOSURE OF THE INVENTION

In one aspect of the present invention, a modular control handle for a work machine control lever having a longitudinal axis and a free end includes a grip assembly having matable first and second members, and first and second openings. The first and second members are disposable about the longitudinal axis wherein the free end of the control lever is receivable in the first opening, and the second opening is bounded by an outer perimeter. At least one control module is positionable in the second opening. A plurality of fasteners connects the first and second members together, maintains the control module at the second opening and fixes the grip assembly to the control lever.

In another aspect of the present invention, a modular control handle for a control lever of a work machine having a longitudinal axis and a free end includes a grip assembly having matable first and second members, and first, second and third openings. The first and second members are matable about a generally longitudinal plane that is coaxial with the longitudinal axis. The first and second members are disposable about the longitudinal axis wherein the free end of the control lever is receivable in the first opening. The second opening is bounded by an outer perimeter and the third opening is disposable on a selected one of the first and second members. At least one control module is positionable in the second opening and another control module is positionable in the third opening. The control module receivable at the second opening is selectable from a rocker switch module, a mechanical actuator module and a blank module. A plurality of fasteners connects the first and second members together, maintains the control module at the second opening and fixes the grip assembly to the control lever.

BRIEF DESCRIPTION OF THE DRAWINGS

FIG. 1 is a perspective view of a modular control handle configured with a rocker switch module and transmission downshift button.

FIG. 2 is an exploded view of the modular control handle from FIG. 1.

FIG. 3 is a perspective view of a modular control handle configured with a mechanical actuator module and transmission top gear selector button.

FIG. 4 is an exploded view of the modular control handle from FIG. 3.

FIG. 5 is a perspective view of a modular control handle configured with a blank module.

BEST MODE FOR CARRYING OUT THE INVENTION

Referring to FIGS. 1 and 2, a modular control handle 10 for a control lever 12 of a work machine is shown. The control lever 12 has a longitudinal axis 14 and a free end 16, and the control handle 10 is mounted to the free end 16. The control handle 10 has a grip assembly 18 with matable first and second members 20,22, and first and second openings 24,26. The first and second members are engageable with each other along a longitudinally extending plane 15 that extends through the longitudinal axis 14. The free end 16 of the control lever 12 is received in the first opening 24 and is secured in place by a fastener 32. The second opening 26 has an outer perimeter 28.

Referring to FIGS. 1 and 2, a control module 29 is shown that embodies a rocker switch assembly 30 that is positioned in the second opening 26. The rocker switch assembly includes a seal cover 46 having a generally oblong shape, an outer lip 48 and a switch receiving opening 50. The seal cover defines an outer lip that has a preselected shape, complementary to that of the second opening defined by the grip portion. The outer lip of the seal cover matably engages the outer perimeter 28. A rocker switch 44 is mounted within the opening 50 in a manner to allow a portion of the rocker switch 44 to protrude through the rocker switch opening 50. Fasteners 32 connect the first and second members 20,22 together along longitudinal plane 15, maintain the rocker switch module 30 in the second opening 26 and fix the grip assembly 18 to the control lever 12.

An optional third opening 34 for receiving another control module such as reciprocating switch 36 is provided in one of the first or second members. The switch 36 is shown to be a transmission control of a well known type, such as a transmission gear reduction switch. Should a switch of this type not be required, a blank member may be placed in the opening to fill the void.

Referring to FIGS. 3 and 4, a modular control handle is shown having an alternate switch configuration 10'. In this embodiment a grip assembly 18' is shown with a control module 29 in the form of a mechanical actuator module 52 replacing rocker switch module 30 (FIG. 2). The control module 29 includes a seal cover 58 that is generally oblong in shape and has first and second actuator openings 62 and 64 formed therein. An outer lip 60 is defined on the periphery of the seal cover that is complimentary in shape to that of the outer perimeter defined by the second opening and is sealingly engaged therewith. The first and second actuator openings 62,64 are adapted to receive the first and second reciprocating switches 54 and 56 respectively. The mechanical actuator module 52 includes a pair of actuators, or switches, having an entirely different action and function than those of the rocker switch assembly 30. The mechanical actuator as illustrated in FIGS. 3 and 4 include a pair of plungers that reciprocate within their mounting to the grip assembly 18. The actuators may relate to a transmission control, for example, and include electronic switches or a mechanical push-pull type plunger or a combination of the two. In the illustrated embodiment, the mechanical actuator is shown to include a first actuator 54, such as a lock release for a transmission, and a second actuator 56, which is in the form of a transmission hold switch.

As in the configuration seen FIG. 2, a plurality of fasteners 32 connect the first and second members 20',22' together, maintain the mechanical actuator module 52 in the second opening 26 and fix the grip assembly 18' to the control lever 12'.

Referring to FIGS. 5 and 6, a modular control handle 10" having a grip assembly 18" is shown with a blank module 40. The blank module 40 has a generally flat and oblong shape and an outer lip 42. The outer lip 42 is defined on the periphery of the blank and is complimentary in shape to that of the outer perimeter 28 defined by the second opening and is sealingly engaged therewith. First member 20" is shown without the optional third opening 34 nor control modules seen in FIGS. 1–4.

A plurality of fasteners 32 connect the first and second members 20",22' together, maintain the blank module 40 in the second opening 26 and fix the grip assembly 18" to the control lever 12.

Industrial Applicability

An ergonometric modular control handle 10 permits operation of different work machinery performing similarly-controlled functions with a commonly-shaped control handle. The modular control handle 10 is assembled at the free end 16 of a control lever 12 by placing a control module 30,52 or a blank module 40 in second opening 26 of first and second member 20,22 and tightening fasteners 32. Because the second opening 26 is shaped to accommodate all applicable control modules and a blank module, the modules are generally interchangeable. Only slight modifications to the interior portions of the grip assembly 18 are required to accommodate various electrical hook-ups between the rocker switch module 30, the mechanical actuator module 52 or the third switch 36. While not shown, it is to be understood that other control modules may be accommodated by the second opening 26. The blank module 40 replaces either the rocker switch module 30 or the mechanical actuator module 52 when it is desirable to utilize a control lever of identical size and feel without the added electrical or mechanical switch functions.

Other aspects, objects and advantages of this invention can be obtained from a study of the drawings, the disclosure, and the appended claims.

What is claimed is:

1. A grip assembly for a control lever having a longitudinal axis and a free end, comprising:

a first member;

a second member matable with the first member to define a first opening adapted to received the free end of the control lever and a second opening having a preselected shape bounded by an outer perimeter;

a plurality of control modules, each control module having a specified function and a preselected shape adapted for positioning in the second opening, the control module having a generally flat and oblong shape and an outer lip having a preselected shape complimentary to that of the outer perimeter of the second opening, the module being positionable within the second opening with the outer lip in sealing contact with the outer perimeter; and a plurality of fasteners connecting the first and second member together, maintaining a selected one of the plurality of control modules within the second opening and fixing the grip assembly to the control lever.

2. The grip assembly for a control lever as set forth in claim 1 wherein the control module includes a mechanical actuator module further including;

a seal cover having first and second openings defined therein and an outer lip having a preselected shape that is complimentary to that of the outer perimeter defined by the second opening;

a first reciprocating actuator positionable for movement within the first opening defined by the seal cover;

a second reciprocating actuator positionable for movement within the second opening defined by the seal cover; and said seal being positionable within the second opening with the outer lip in sealing contact with the outer perimeter.

3. A modular control handle for a control lever of a work machine, the control lever having a longitudinal axis and a free end, comprising:

a grip assembly having first and second members matable along a generally longitudinal plane that extends through the longitudinal axis, said first and second members being disposed about the longitudinal axis in a manner wherein the free end of the control lever is receivable in a first opening defined between the first and second members;

a second opening having a preselected shape and being bounded by an outer perimeter, said opening being defined by the grip portion along the interface between the first and second members;

a third opening defined in one of the first and second members;

a first control module having a preselected shape complimentary to the preselected shape defined by the second opening defined by the grip assembly and being receivable therein, said first control module being receivable therein, said first control module being selectable from a first plurality of switch configurations;

a second control module receivable within the third opening and being selectable from a plurality of switch configurations;

said modules having a generally flat and oblong shape and an outer lip having a preselected shape complimentary to that of the outer perimeter of the second opening, said module being positionable within the second opening with the outer lip in sealing contact with the outer perimeter; and a plurality of fasteners connecting the first and second members together for maintaining the first control module within the second opening and fixing the grip assembly to the control lever.

4. The modular control handle as set forth in claim 3 wherein the control module further includes:

a seal cover having a first and second opening defined therein and an outer lip having a preselected shape that is complimentary to that of the outer perimeter defined by the second opening;

a first reciprocating actuator positionable for movement within the first opening defined by the seal cover;

a second reciprocating actuator positionable with the second opening defined by the seal cover; and said seal cover being positionable within the second opening with the outer lip in sealing contact with the outer perimeter.

* * * * *